(12) United States Patent
Matsunaga et al.

(10) Patent No.: US 10,469,779 B2
(45) Date of Patent: Nov. 5, 2019

(54) IMAGE CAPTURING APPARATUS

(71) Applicant: Olympus Corporation, Hachioji-shi, Tokyo (JP)

(72) Inventors: Takuya Matsunaga, Tokyo (JP); Tatsuya Kino, Tokyo (JP); Takeyuki Ajito, Tokyo (JP)

(73) Assignee: Olympus Corporation, Tokyo (JP)

( * ) Notice: Subject to any disclaimer, the term of this patent is extended or adjusted under 35 U.S.C. 154(b) by 57 days.

(21) Appl. No.: 15/808,441

(22) Filed: Nov. 9, 2017

(65) Prior Publication Data
US 2018/0152651 A1 May 31, 2018

(30) Foreign Application Priority Data

Nov. 30, 2016 (JP) ................................. 2016-232339

(51) Int. Cl.
*H04N 5/359* (2011.01)
*H04N 9/07* (2006.01)
*H04N 5/369* (2011.01)

(52) U.S. Cl.
CPC ........... *H04N 5/359* (2013.01); *H04N 5/3696* (2013.01); *H04N 9/07* (2013.01)

(58) Field of Classification Search
CPC ......... H04N 5/359; H04N 5/3696; H04N 9/07
See application file for complete search history.

(56) References Cited

U.S. PATENT DOCUMENTS

| 2009/0128671 | A1* | 5/2009 | Kusaka | H04N 5/23212 348/246 |
| 2009/0273843 | A1* | 11/2009 | Raskar | G02B 27/0018 359/601 |
| 2011/0157454 | A1* | 6/2011 | Matsuoka | H01L 27/14627 348/340 |
| 2015/0062386 | A1* | 3/2015 | Sugawara | G02B 7/34 348/241 |
| 2016/0191826 | A1* | 6/2016 | Furuya | H04N 5/217 348/246 |
| 2017/0070689 | A1* | 3/2017 | Silverstein | H04N 5/3572 |
| 2018/0338096 | A1* | 11/2018 | Matsunaga | H04N 5/3572 |

FOREIGN PATENT DOCUMENTS

| JP | 2013-013007 | 1/2013 |
| JP | 5121998 | 1/2013 |
| JP | 2016144090 A * | 8/2016 |

* cited by examiner

*Primary Examiner* — Timothy J Henn
(74) *Attorney, Agent, or Firm* — John C. Pokotylo; Pokotylo Patent Services

(57) ABSTRACT

An image capturing apparatus includes: a ghost detection unit that detects a ghost generated in a signal obtained from an image capturing element; a correction-target-pixel setting unit that sets, as a correction-target pixel, an image pixel affected by crosstalk of the ghost from among image pixels adjacent to a focus-detection pixel; and a pixel correction unit that corrects the correction-target pixel according to a correction value calculated from an image pixel located in the vicinity of the correction-target pixel.

10 Claims, 30 Drawing Sheets

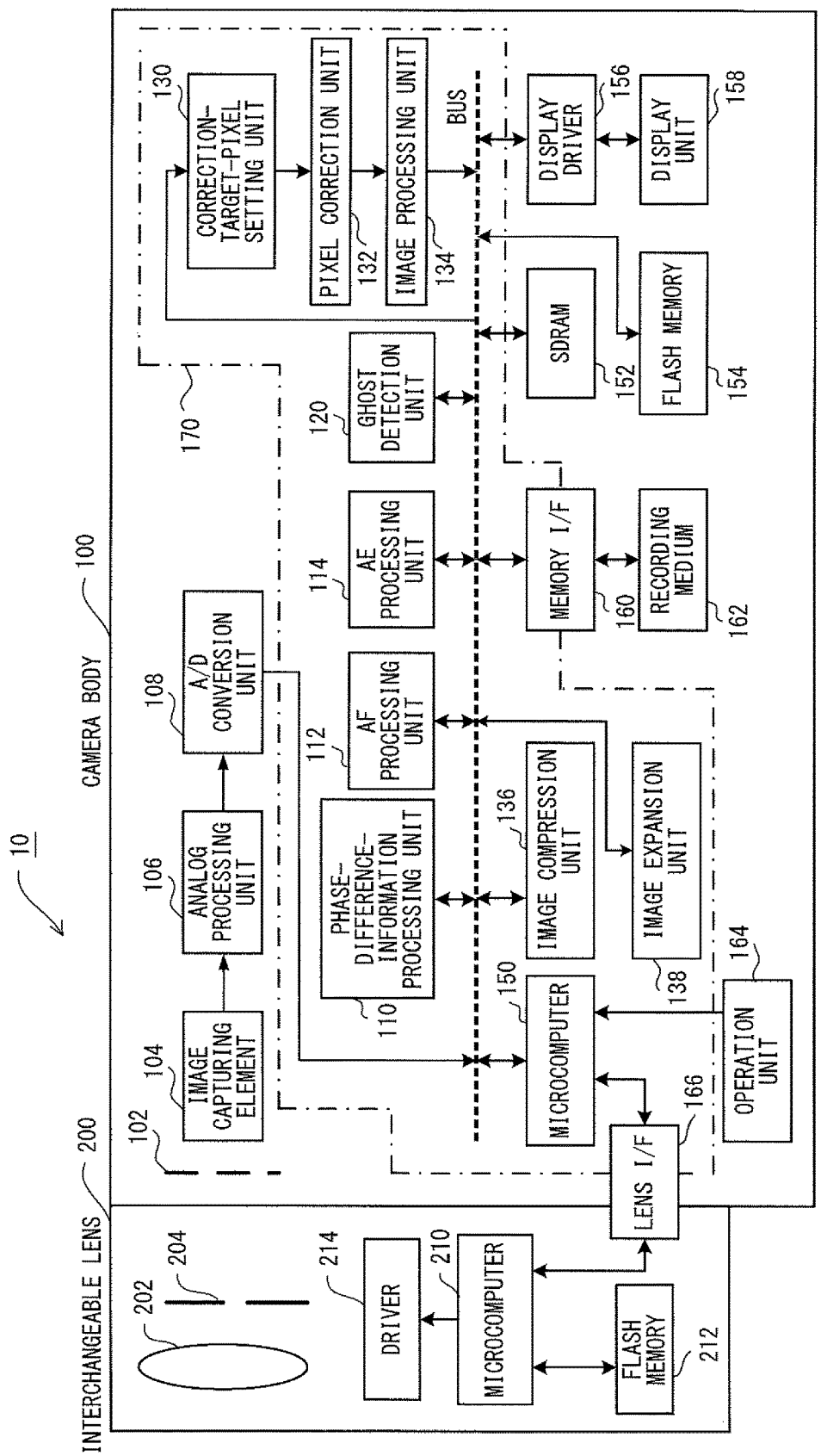
F I G. 1

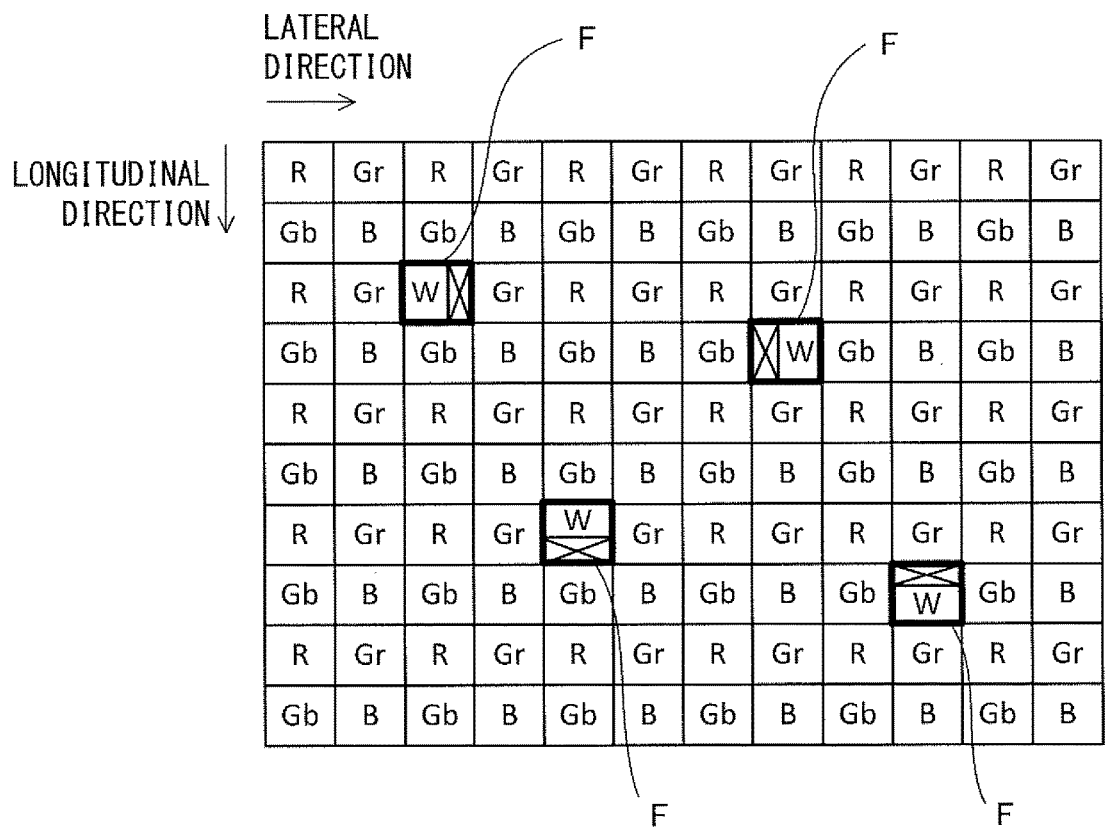
F I G. 2 A

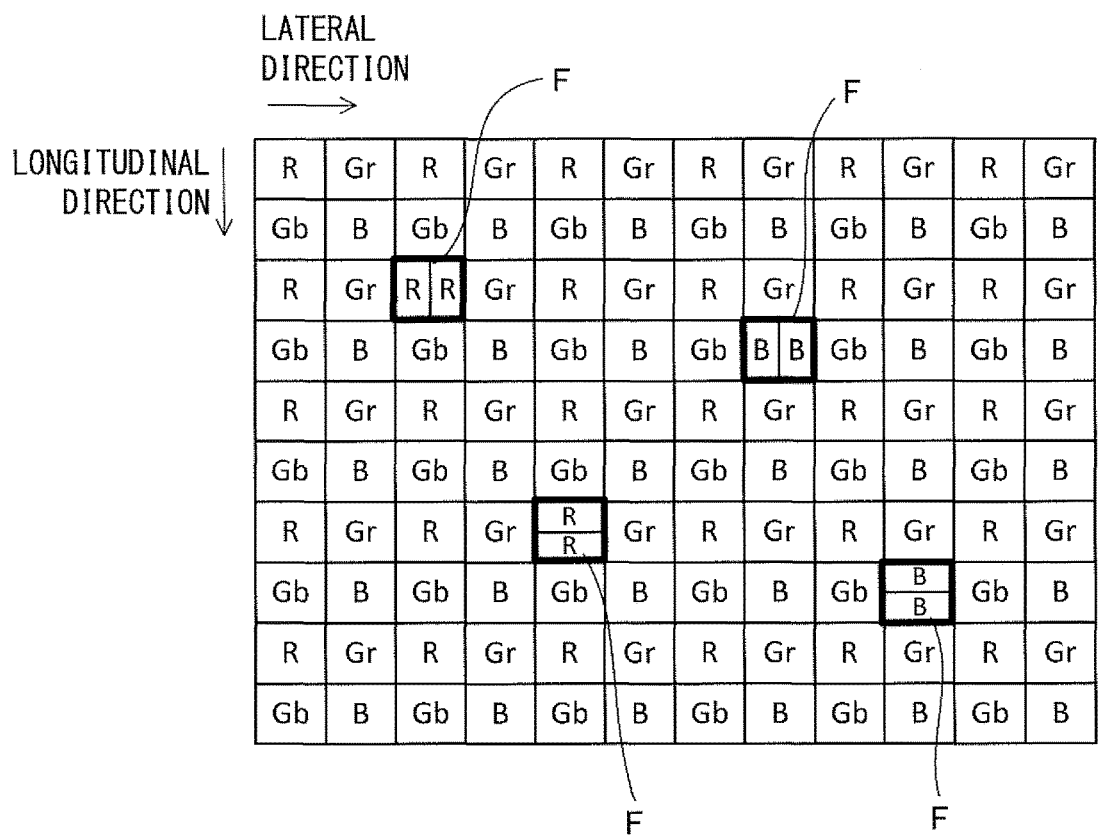
F I G. 3 A

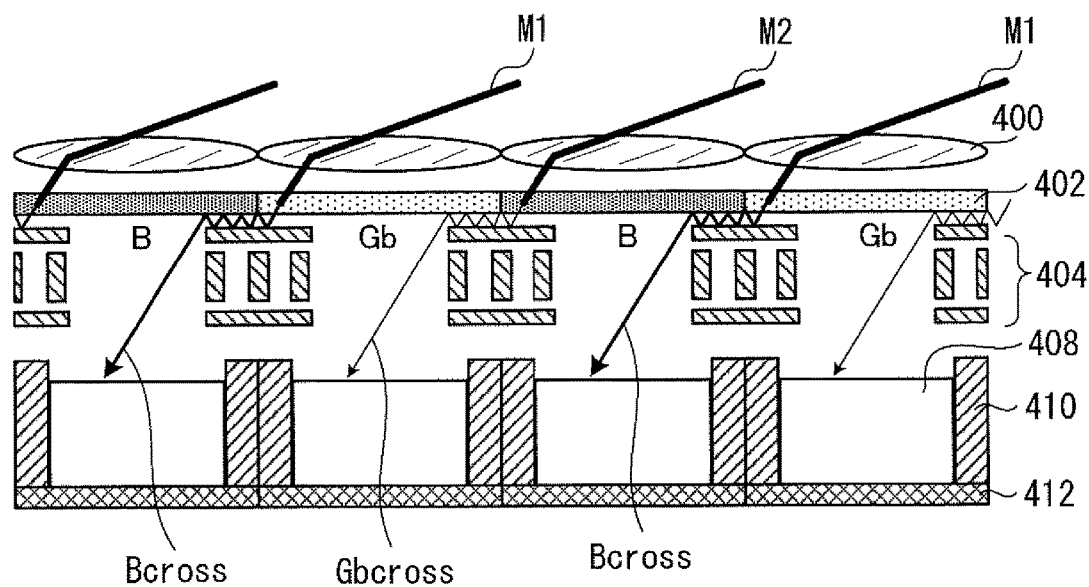
F I G. 5 A

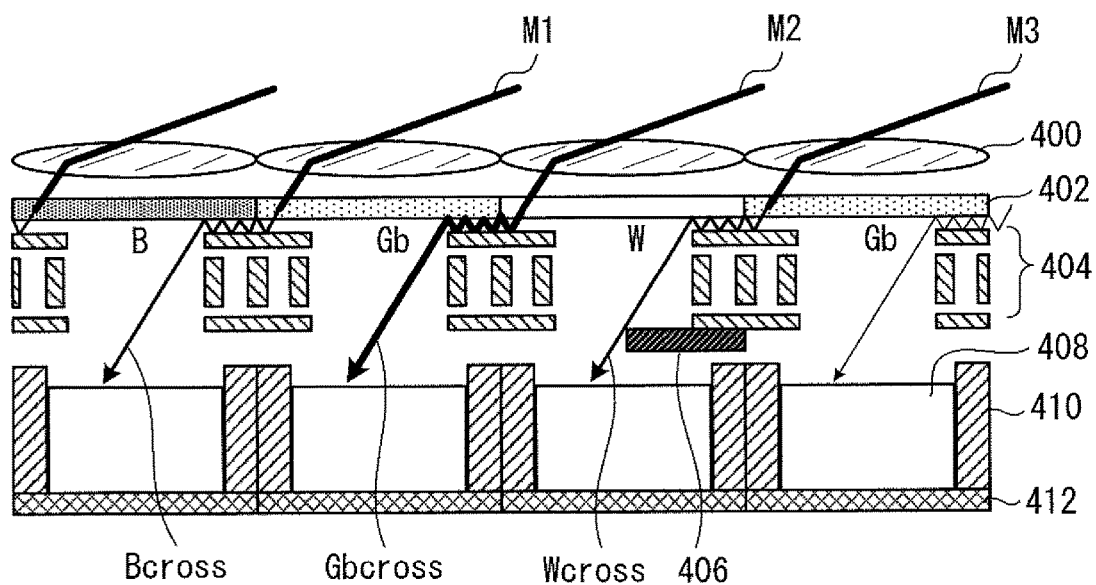
F I G. 5 C

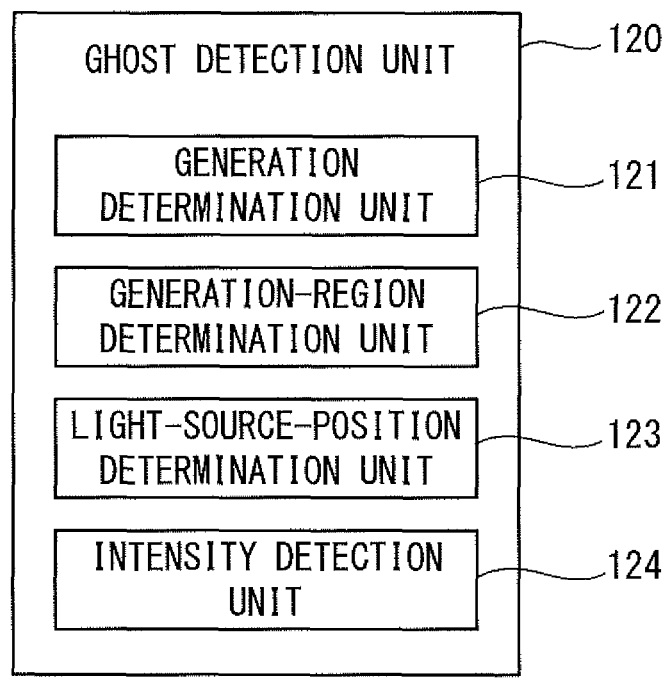
F I G. 6

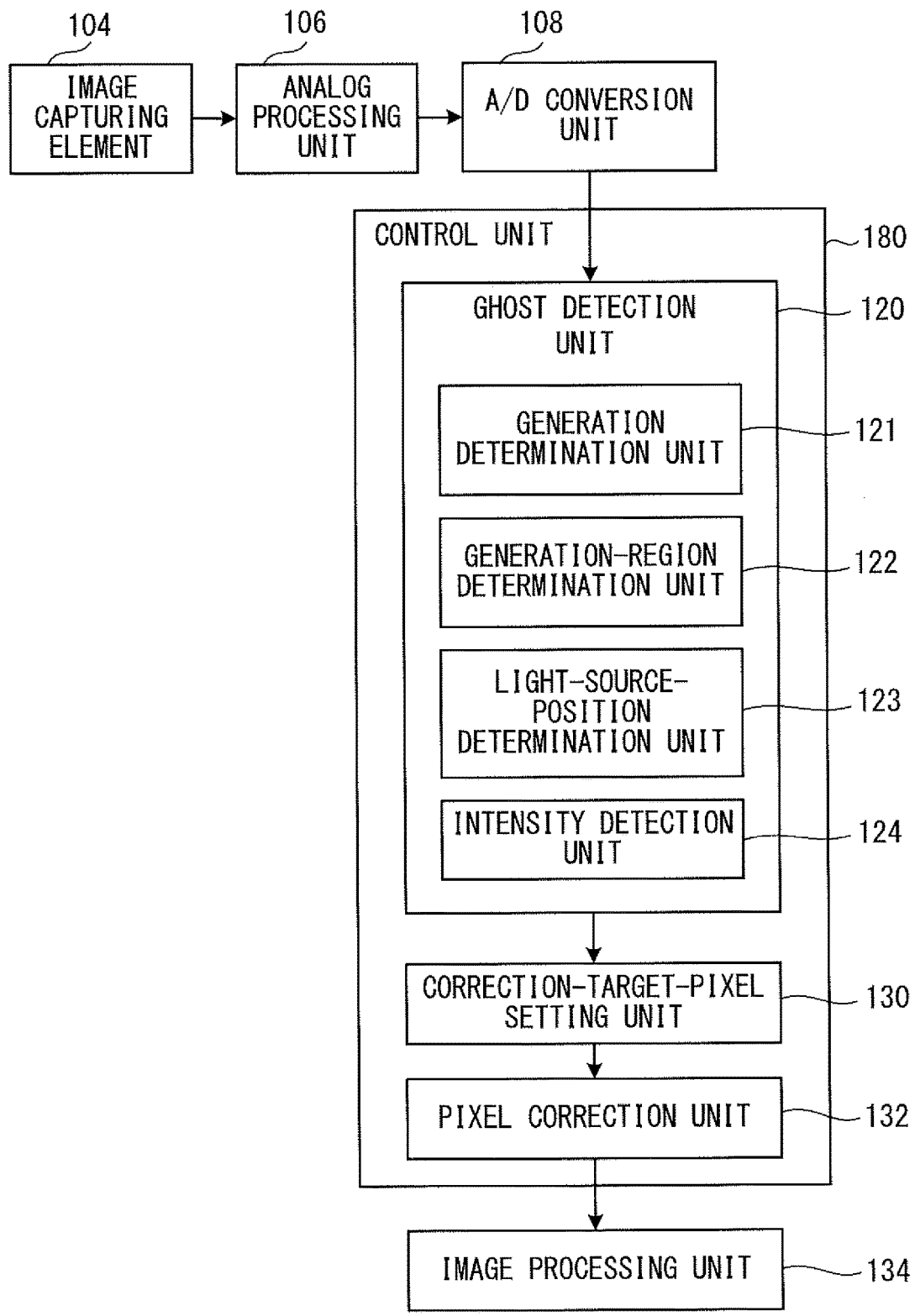
F I G. 7

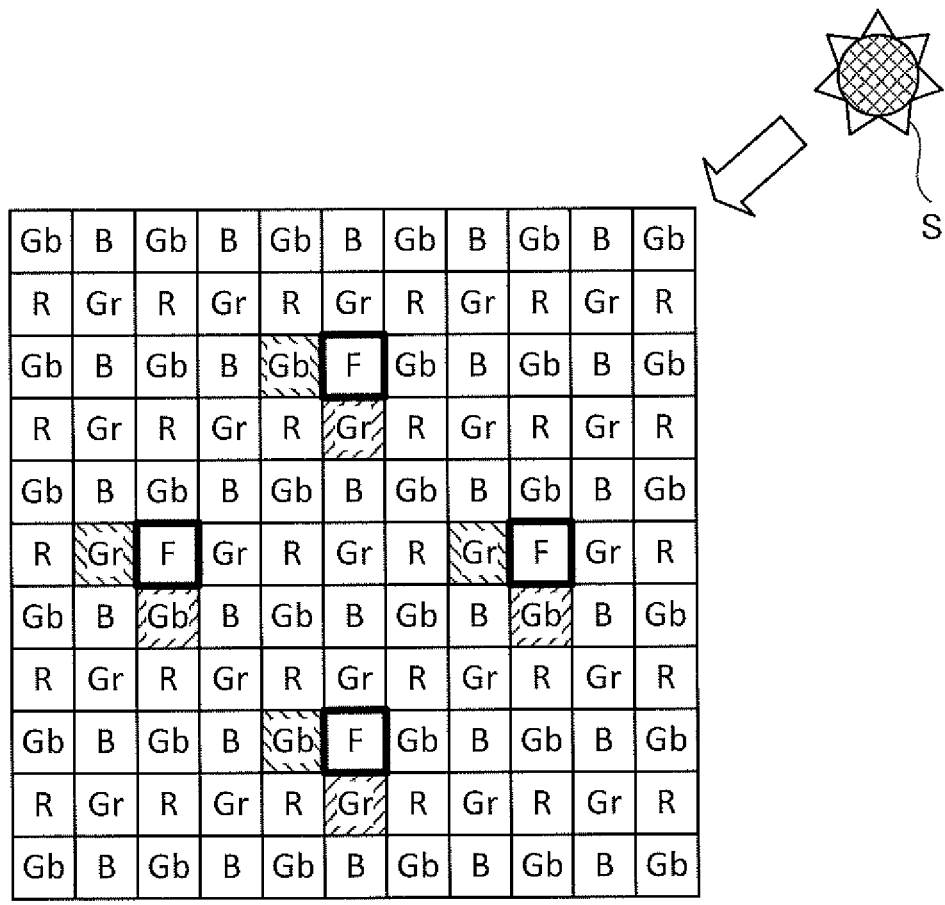
F I G. 1 1 A

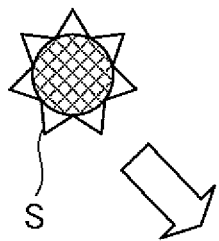
|Gb|B|Gb|B|Gb|B|Gb|B|Gb|B|Gb|
|---|---|---|---|---|---|---|---|---|---|---|
|R|Gr|R|Gr|R|Gr|R|Gr|R|Gr|R|
|Gb|B|Gb|B|Gb|F|Gb|B|Gb|B|Gb|
|R|Gr|R|Gr|R|Gr|R|Gr|R|Gr|R|
|Gb|B|Gb|B|Gb|B|Gb|B|Gb|B|Gb|
|R|Gr|F|Gr|R|Gr|R|Gr|F|Gr|R|
|Gb|B|Gb|B|Gb|B|Gb|B|Gb|B|Gb|
|R|Gr|R|Gr|R|Gr|R|Gr|R|Gr|R|
|Gb|B|Gb|B|Gb|F|Gb|B|Gb|B|Gb|
|R|Gr|R|Gr|R|Gr|R|Gr|R|Gr|R|
|Gb|B|Gb|B|Gb|B|Gb|B|Gb|B|Gb|
F I G.   1 1 B

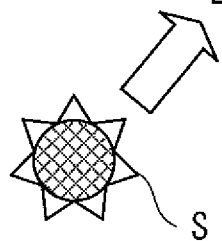
F I G. 1 1 D

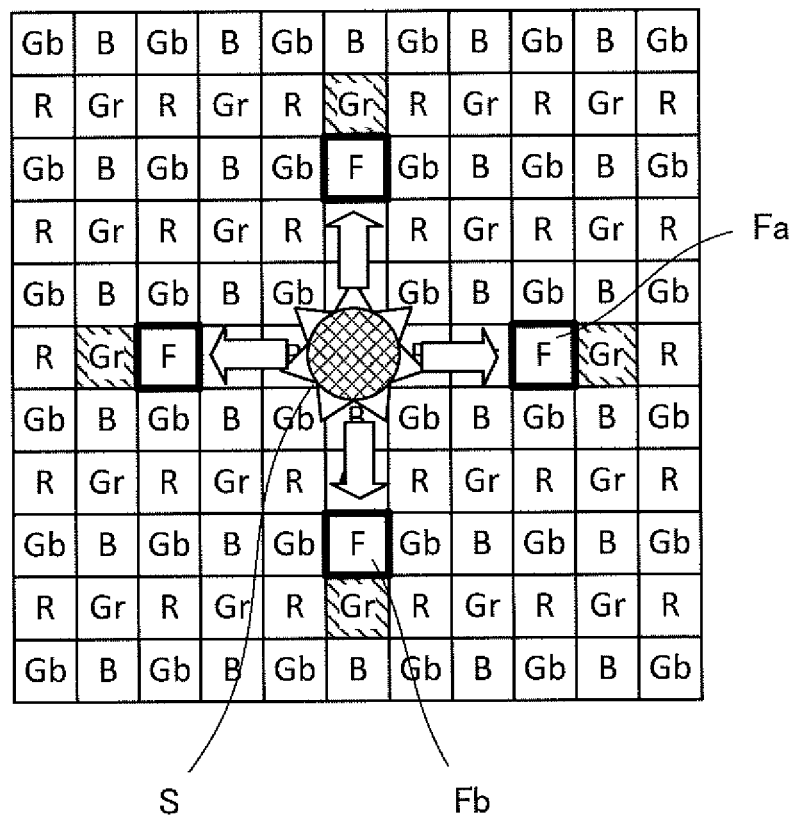
F I G. 13A

IMAGE CAPTURING APPARATUS

CROSS-REFERENCE TO RELATED APPLICATION

This application is based upon and claims the benefit of priority of the prior Japanese Patent Application No. 2016-232339, filed on Nov. 30, 2016, the entire contents of which are incorporated herein by reference.

BACKGROUND OF THE INVENTION

Field of the Invention

The present invention relates to an image capturing apparatus that prevents a decrease in image quality caused by ghost light.

Description of the Related Art

Recently, image capturing apparatuses have been developed that are equipped with image capturing elements that have focus-detection pixels installed therein. Focus-detection pixels are often provided with color filters that have different permeation characteristics from those of typical image-generation pixels. Due to the difference in permeation characteristics, a ghost (this is also referred to as a "flare") affects pixels located near a focus-detection pixel differently from other pixels. Hence, each pixel of an image capturing element that has focus-detection pixels installed therein is differently affected by a ghost, and this may lead to image noise when a ghost is generated.

A technique has been proposed for preventing a decrease in image quality that is caused by a ghost. An example of such a proposed technique is an image capturing apparatus that, when a ghost has been judged to have been generated, corrects the pixel values of image-capturing pixels located near a focus-detection pixel on the basis of a weighting factor, and that performs a ghost suppressing process by smoothening the corrected pixel values of the image-capturing pixels (patent document 1).

Patent Document 1: Japanese Laid-open Patent Publication No. 2013-13007

SUMMARY OF THE INVENTION

An image capturing apparatus in accordance with an embodiment includes: an image capturing element that includes image pixels that generate a signal for an image, and focus-detection pixels that generate a signal for focus detection; a ghost detection circuit that detects a ghost generated in a signal obtained from the image capturing elements; a correction-target image setting circuit that, when the ghost detection unit has detected that a ghost has been generated, sets, as a correction-target pixel, an image pixel affected by crosstalk of the ghost from among image pixels adjacent to the focus-detection pixels; and a pixel correction circuit that corrects the correction-target pixel according to a correction value calculated from an image pixel located in the vicinity of the correction-target pixel.

BRIEF DESCRIPTION OF THE DRAWINGS

FIG. 1 is a functional block diagram illustrating an exemplary configuration of an image capturing apparatus to which the present invention is applied;

FIG. 2A illustrates a pixel arrangement in an image capturing element based on a light blocking scheme;

FIG. 3A illustrates a pixel arrangement in an image capturing element based on a PD division scheme;

FIG. 5A illustrates crosstalk in a pixel array of (B, Gb, B, Gb);

FIG. 5C illustrates that the amount of crosstalk increases in a pixel adjacent to a focus-detection pixel;

FIG. 6 is a block diagram illustrating details of a ghost detection unit;

FIG. 7 is a functional block diagram for a situation in which a ghost detection unit is achieved by software;

FIG. 11A illustrates the position of a correction-target pixel for a situation in which a light source is located diagonally to the upper right of an image capturing plane;

FIG. 11B illustrates the position of a correction-target pixel for a situation in which a light source is located diagonally to the upper left of an image capturing plane;

FIG. 11D illustrates the position of a correction-target pixel for a situation in which a light source is located diagonally to the lower left of an image capturing plane;

FIG. 13A illustrates the position of a correction-target pixel for a situation in which a light source is located within an image plane;

DETAILED DESCRIPTION OF THE PREFERRED EMBODIMENTS

Figure 2B:
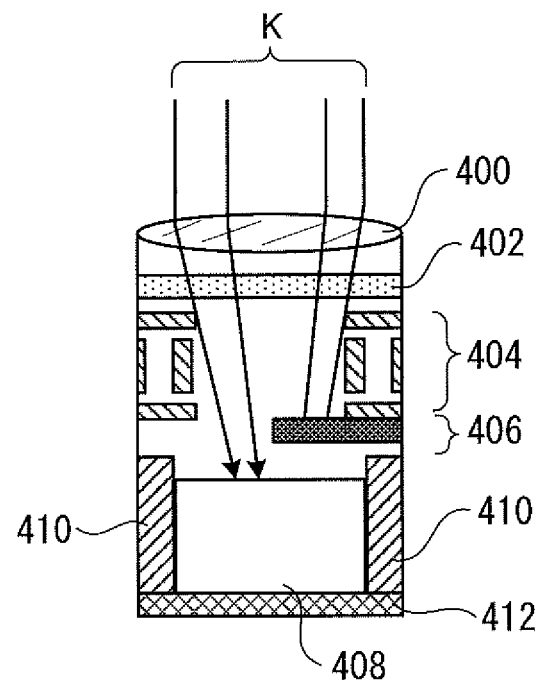
FIG. 2B illustrates the structure of an image capturing element based on a light blocking scheme.

The following describes embodiments of the invention with reference to the drawings. FIG. 1 is a functional block diagram illustrating an exemplary configuration of an image capturing apparatus (camera system 10) to which the invention is applied. The camera system 10 includes a camera body 100 and an interchangeable lens 200 attachable to the camera body 100. The image capturing apparatus of the invention may be a lens-fixed camera, or may be an image capturing apparatus installed in a portable terminal (smartphone).

The camera body 100 includes a mechanical shutter 102, an image capturing element 104, an analog processing unit 106, an A/D conversion unit 108, a phase-difference-information processing unit 110, an AF processing unit 112, an AE processing unit 114, a ghost detection unit 120, a correction-target-pixel setting unit 130, a pixel correction unit 132, and an image processing unit 134.

The mechanical shutter 102 controls a time at which a light flux from a subject passes therethrough. The mechanical shutter 102 is, for example, a publicly known focal-plane shutter.

The image capturing element 104 captures an image of a subject, applies photoelectric change to the image, and outputs an image signal. The image capturing element 104 includes photodiodes that form pixels in a manner such that those diodes are arranged in a two-dimensional matrix formation.

The image capturing element 104 used in the present embodiment includes a focus-detection pixel between ordinary pixels (image pixels). An image pixel is a pixel for generating an image. A focus-detection pixel is a pixel for detecting a focus that outputs phase information. Focus detection schemes include a light blocking scheme and a PD division scheme. The image capturing element 104 will be described hereinafter by referring to FIGS. 2A-3B.

The analog processing unit 106 applies analog processing to an image signal read from the image capturing element 104. The analog processing includes correlated double sampling processing and gain adjustment processing. The analog processing unit 106 may be referred to as an analog processing circuit.

The A/D conversion unit 108, which is an analog-to-digital converter, converts the image signal to which analog processing has been applied by the analog processing unit 106 into an image signal in a digital format (pixel data). The A/D conversion unit 108 may be referred to as an A/D conversion circuit.

The phase-difference-information processing unit 110 outputs distance information and focusing state information of a subject according to phase information output from a focus-detection pixel of the image capturing element 104. The phase-difference-information processing unit 110 may be referred to as a phase-difference-information processing circuit.

The AF processing unit 112 calculates a focusing evaluation value according to output from the phase-difference-information processing unit 110. The AE processing unit 114 measures the brightness of a subject according to image data and outputs subject brightness information. The AF processing unit 112 may be referred to as an AF processing circuit.

The ghost detection unit 120 determines whether a ghost has been generated within an image plane, determines a ghost-generated region, determines the position of a light source of the ghost, and detects a ghost intensity. A ghost (also called a ghost image) refers to an optical image formed by the image capturing element 104 when unwanted light (also called stray light) that has been reflected from a lens surface or an inner surface of a lens barrel enters the image capturing element 104. Unwanted light that forms a ghost may hereinafter be referred to as ghost light. A ghost and a flare are hereinafter not particularly distinguished from each other.

The following describes an example in which the ghost detection unit 120 performs ghost detection using image data, but means for detecting a ghost are not limited to this. For example, the ghost detection unit 120 may be provided with a sensor that senses unwanted light reflected from portions around the image capturing element 104, so as to perform ghost detection based on output from the sensor. Details of the ghost detection unit 120 will be described hereinafter by referring to FIG. 6. The ghost detection unit 120 may be referred to as a ghost detection circuit.

The correction-target-pixel setting unit 130 sets, as a correction-target pixel, an image pixel affected by crosstalk of ghost light from among image pixels adjacent to a focus-detection pixel. Ghost light that has passed through a focus-detection pixel and leaked into a neighboring pixel is hereinafter referred to as crosstalk. The correction-target-pixel setting unit 130 may be referred to as a correction-target-pixel setting circuit.

The pixel correction unit 132 performs various pixel corrections. The pixel correction unit 132 corrects a correction-target pixel that has been affected by crosstalk. The pixel correction unit 132 corrects the correction-target pixel by generating a correction value through interpolation computation of surrounding image pixels. In addition, the pixel correction unit 132 performs a process of complementing a focus-detection pixel by correcting it using surrounding image pixels. The pixel correction unit 132 also performs a process of correcting a pixel judged to be a faulty pixel using surrounding image pixels. The pixel correction unit 132 may be referred to as a pixel correction circuit.

The image processing unit 134 performs white balance (WB) correction, synchronization processing for Bayer data, color reproduction processing, gamma correction processing, color matrix computation, noise reduction (NR) processing, and edge enhancement processing. The image processing unit 134 may be referred to as an image processing circuit.

The camera body 100 includes an image compression unit 136 and an image expansion unit 138. The image compression unit 136 compresses image data of a still image in accordance with a JPEG scheme, and compresses image data of a moving image in accordance with various schemes such as MPEG. The image expansion unit 138 expands JPEG image data and MPEG image data to display restored images. The image compression unit 136 and the image expansion unit 138 may be referred to as an image compression circuit and an image expansion circuit, respectively.

The camera body 100 includes a microcomputer 150, an SDRAM (Synchronous Dynamic Random Access Memory) 152, a flash memory 154, a display driver 156, a display unit 158, a memory IF (Interface) 160, a recording medium 162, an operation unit 164, and a lens IF (Interface) 166.

The microcomputer 150 is a processor that comprehensively controls the entirety of the camera system 10. The microcomputer 150 performs various sequences for the camera by reading and executing a control program stored in the flash memory 154. The operation unit 164 and the lens IF 166 are connected to the microcomputer 150.

The SDRAM 152 is a nonvolatile memory that allows temporarily stored data such as image data to be electrically rewritten. The SDRAM 152 temporarily stores image data output from the A/D conversion unit 108 and image data processed by the image processing unit 134. The SDRAM 152 is achieved by a typical memory IC (Integrated Circuit).

The flash memory 154 stores various pieces of information such as an optical property and an adjustment value of the interchangeable lens 200 in addition to the control program described above. The flash memory 154 is achieved by a typical memory IC (Integrated Circuit).

The display driver 156 causes the display unit 158 to display an image based on image data that has been read from the SDRAM 152 or the recording medium 162 and expanded by the image expansion unit 138. The display unit 158 consists of, for example, an LCD and displays an image output from the display driver 156.

The memory IF 160 is connected to the recording medium 162 and performs control to write/read data such as image data or a header attached to the image data to/from the recording medium 162.

The recording medium 162 is a recording medium such as a memory card that is attachable to the camera body 100. The recording medium 162 may be hard disk drive installed in the camera body 100.

The operation unit 164 includes operation members such as a power button, a release button, a moving-image button, a play button, a menu button, a D-pad, an OK button, various entry buttons, and various entry keys (not illustrated). The operation unit 164 reports operation states of those operation members to the microcomputer 150.

The lens IF 166 is an interface for enabling an intercommunication between a microcomputer 210 within the interchangeable lens 200 and the microcomputer 150 within the camera body 100.

The interchangeable lens 200 includes a lens 202, a stop 204, a microcomputer 210, a flash memory 212, and a driver 214.

The lens 202 includes a plurality of optical lenses for forming an image of a subject (including a focus lens for focusing). The lens 202 may be a fixed focal lens or a zoom lens. An aperture size of the stop 204 is variable, and the stop 204 controls the light quantity of a light flux from a subject that passes through the lens 202.

The microcomputer 210 transmits information from the flash memory 212 to the microcomputer 150 within the camera body 100. The microcomputer 210 is a processor that controls the interchangeable lens 200. The flash memory 212 stores various pieces of information such as an optical property and an adjustment value of the interchangeable lens 200 in addition to the control program.

The driver 214 controls the position of a focus lens included in the lens 202 and the aperture size of the stop 204.

Parts within an area enclosed by a dashed dotted line in FIG. 1 (e.g., the phase-difference-information processing unit 110 and the microcomputer 150) are provided within an ASIC (Application Specific Integrated Circuit) 170. All of or some of those types of processing performed by the ASIC 170 may be achieved by either a hardware-based circuit, a packaged IC, a DSP (digital signal processor), or software processing based on a CPU.

Figure 3B:
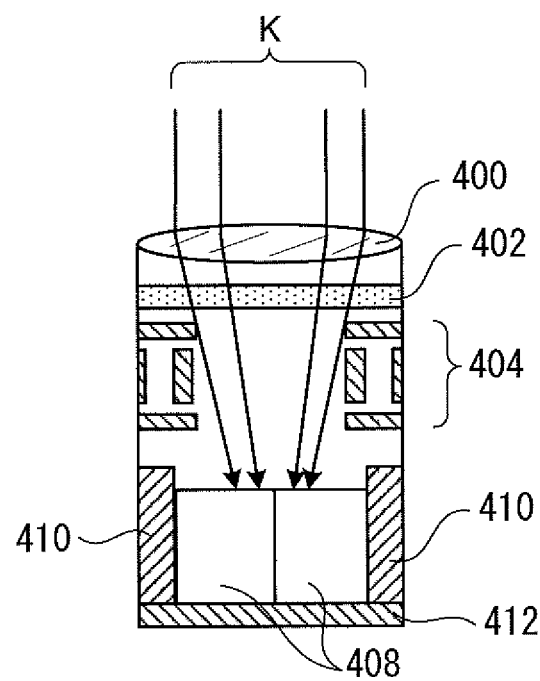
FIG. 3B illustrates the structure of an image capturing element based on a PD division scheme.

By referring to FIGS. 2A and 3B, the following briefly describes a pixel arrangement of the image capturing element 104 and the structure of a focus-detection pixel in accordance with the embodiment. As described above, the focus detection schemes include a light blocking scheme and a PD division scheme. The structure of a focus-detection pixel is different for each focus detection scheme.

FIGS. 2A and 2B are explanatory diagrams for the image capturing element 104 based on the light blocking scheme. FIG. 2A illustrates a pixel arrangement in the image capturing element 104 based on the light blocking scheme. The following descriptions are directed to an example in which color filters are arranged in a Bayer pattern, but the arrangement of color filters is not limited to the Bayer arrangement; various arrangements may be applied.

Pixels indicated as R, B, Gr, and Gb are image pixels. R, B, Gr, and Gb indicate the colors of color filters. Gr and Gb, both of which are green pixels, respectively correspond to a G disposed in a red (R) array and a G disposed in a blue (B) array. A horizontal direction is referred to as a lateral direction, and a vertical direction is referred to as a longitudinal direction. A focus-detection pixel indicated by a thick-bordered box is located between image pixels. F indicates a focus-detection pixel. W indicates that the color filter of a focus-detection pixel is transparent.

FIG. 2B illustrates the structure of a focus-detection pixel based on the light blocking scheme. FIG. 2B is a cross-sectional view of a focus-detection pixel. The focus-detection pixel includes a microlens 400, a color filter 402, a wiring layer 404, a light block 406, a photodiode 408, a substrate 410, and a base 412. The microlens 400, the wiring layer 404, the photodiode 408, the substrate 410, and the base 412 are similar to those of a typical image pixel, and their descriptions are omitted herein.

In the light block scheme, the color filter 402 of a focus-detection pixel is often different from the color filter of an image pixel. In this example, descriptions are mainly given of a focus-detection pixel that includes a transparent (White) color filter 402.

A transparent filter has an advantage in that it can receive more light than a colored color filter. Of course, a colored color filter is also sufficient for phase detection. The light block 406 blocks a right/left portion or an upper/lower portion of incident light K. In the example of FIG. 2B, a right portion of incident light K is blocked. For example, a phase difference may be detected between a signal of the right region and a signal of the left region so as to determine whether a subject is out of focus.

FIGS. 3A and 3B depict the image capturing element 104 based on a PD division scheme. FIG. 3A illustrates a pixel arrangement in the image capturing element 104 based on the PD division scheme. As in FIG. 2A, a thick-bordered box indicates a focus-detection pixel (F). FIG. 3B illustrates the structure of a focus-detection pixel based on the PD division scheme. A focus-detection pixel includes a microlens 400, a color filter 402, a wiring layer 404, a photodiode 408, a substrate 410, and a base 412.

A focus-detection pixel based on the PD division scheme includes a pair of photodiodes 408. A left photodiode 408 receives incident light K that has passed through a left portion of the microlens 400. A right photodiode 408 receives incident light K that has passed through a right portion of the microlens 400. The pair of photodiodes 408 may be upper and lower photodiodes, rather than right and left photodiodes.

FIG. 3A depicts an example of colors with the color filters 402 of focus-detection pixels following a Bayer arrangement, but the invention is not limited to this. For example, the color filters 402 of focus-detection pixels may be transparent to increase the quantity of light incident on the focus-detection pixels, as in FIG. 2A. Alternatively, the color filters 402 of focus-detection pixels may be colored differently from the color filters of image pixels.

Figure 4:
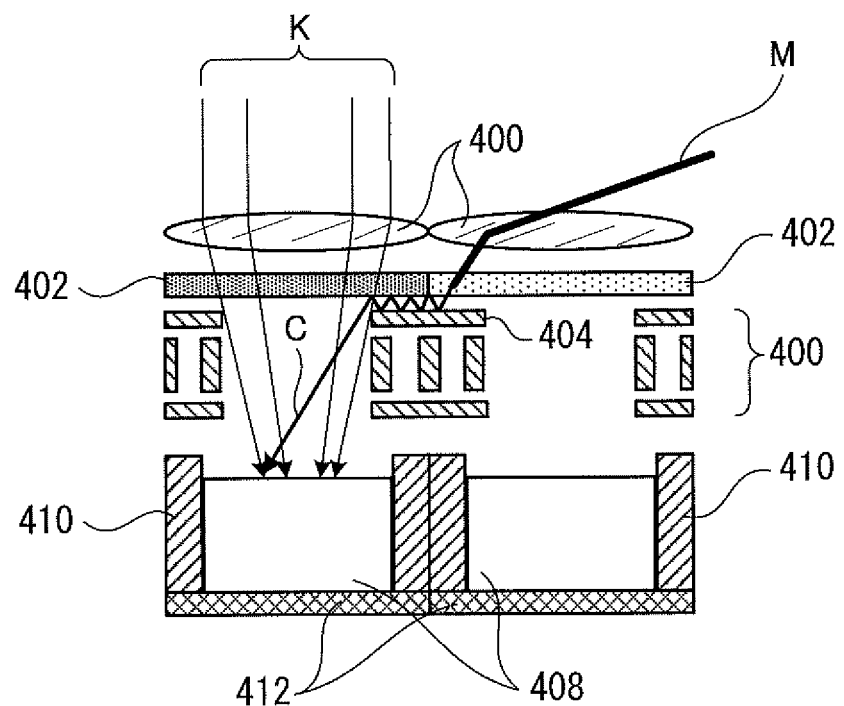
FIG. 4 illustrates an occurrence of crosstalk.

The following briefly describes the principles of an occurrence of crosstalk that is caused by ghost light. FIG. 4 illustrates an occurrence of crosstalk that is caused by ghost light (unwanted light) reflected from a lens surface or an inner surface of a lens barrel. Ghost light M is incident on a right pixel in FIG. 4 at a small angle. The ghost light M that has passed through the microlens 400 and the color filter 402 of the right pixel is reflected on the upper surface of the wiring layer 404 located at the border between the right and left pixels and then enters the left pixel. The ghost light M that has entered the adjacent pixel becomes crosstalk C (crosstalk light).

In addition to the original incident light K, the photodiode 408 of the left pixel receives crosstalk C, i.e., noise. Ghost light M is attenuated as a result of passing through the right color filter 402, and hence the amount of crosstalk C is changed in accordance with the characteristics of the right color filter 402 through which ghost light M passes.

Figure 5B:
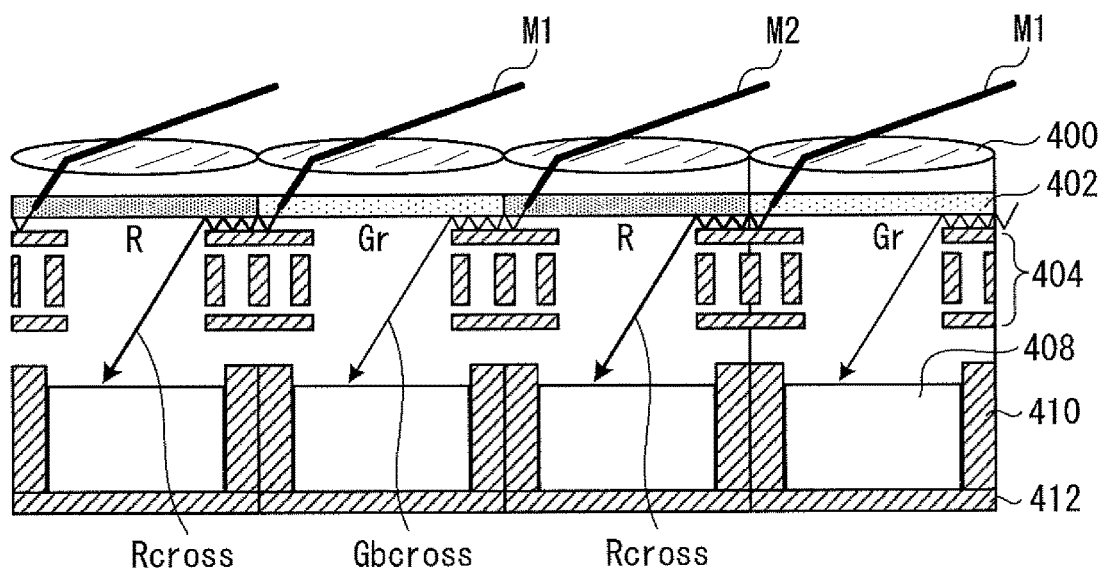
FIG. 5B illustrates crosstalk in a pixel array of (R, Gr, R, Gr)

FIGS. 5A-5C illustrate that the magnitude of crosstalk C leaked into a neighboring pixel is changed in accordance with the characteristics of a color filter 402 on which ghost light M is incident.

FIG. 5A illustrates crosstalk in a pixel array of (B, Gb, B, Gb). Ghost light M1 that has passed through the color filter 402 of a Gb pixel and then has been leaked into a neighboring B pixel becomes crosstalk Bcross. Ghost light M2 that has passed through the color filter 402 of the B pixel and then has been leaked into a neighboring Gb pixel becomes crosstalk Gbcross.

FIG. 5B illustrates crosstalk in a pixel array of (R, Gr, R, Gr). Ghost light M1 that has passed through the color filter 402 of a Gr pixel and then has been leaked into a neighboring R pixel becomes crosstalk Rcross. Ghost light M2 that has passed through the color filter 402 of the R pixel and then has been leaked into a neighboring Gr pixel becomes crosstalk Grcross.

Owing to the difference in transmittance between the color filters, Rcross≈Bcross>Grcross>Gbcross is typically satisfied. This increases the number of R signals and B signals because of the influence of crosstalk in comparison with the original RGB balance. More R signals and B signals lead to a wider magenta (purple) region on the screen. That is, magenta becomes noticeable in regions of a ghost. Accordingly, generation of a ghost can be determined by detecting magenta on the screen.

FIG. 5C illustrates that the amount of crosstalk increases in a pixel adjacent to a focus-detection pixel. FIG. 5C depicts an example of a pixel array of (B, Gb, W, Gb). In this example, a image capturing element 104 based on the light blocking scheme is described. The color filter 402 of a focus-detection pixel is transparent (W), and the focus-detection pixel is referred to as a W pixel.

Ghost light M1 that has passed through the color filter 402 of a Gb pixel and then has been leaked into a neighboring B pixel becomes crosstalk Bcross. Ghost light M2 that has passed through the color filter 402 of a W pixel and then has been leaked into a neighboring Gb pixel becomes crosstalk Gbcross. Ghost light M3 that has passed through the color filter 402 of the Gb pixel and then has been leaked into the neighboring W pixel becomes crosstalk Wcross.

In the pixel array of FIG. 5C, the second B pixel from the right is changed to the focus detection pixel with respect to the pixel array of FIG. 5A. Hence, the Gbcross in FIG. 5C is greater than the Gbcross in FIG. 5A. This is because the spectral transmittance of the color filter 402 of the focus-detection pixel is higher than that of the color filter 402 of a pixel since the color filter 402 of the focus-detection pixel is transparent. Accordingly, the amount of crosstalk leaked into the Gb pixel that is adjacent to the focus-detection pixel would be larger than that of crosstalk leaked into the Gb pixel that is not adjacent to the focus-detection pixel.

As described above, when the color filter of a focus-detection pixel is different from that of image pixels, the amount of crosstalk leaked into an image pixel located around the focus-detection pixel is different from the amount of crosstalk leaked into an image pixel distant from the focus-detection pixel. The difference in the amount of crosstalk emerges as noise on the screen.

FIG. 6 is a block diagram illustrating details of the ghost detection unit 120. The ghost detection unit 120 includes a generation determination unit 121, a generation-region determination unit 122, a light-source-position determination unit 123, and an intensity detection unit 124.

The ghost detection unit 120 divides a screen into predetermined regions according to image data and, for each region, detects a difference between a Gr pixel and a Gb pixel and the saturation of the color magenta. The determination process and detection process described in the following are performed using the difference between a Gr pixel and a Gb pixel and the saturation of a color magenta that are detected for each region.

The generation determination unit 121 determines whether a ghost has been generated. In particular, for each region, the generation determination unit 121 determines whether a ghost has been generated in accordance with whether the difference between a Gr pixel and a Gb pixel is equal to or greater than a predetermined value and/or whether the saturation of the color magenta is equal to or greater than a predetermined value.

The generation-region determination unit 122 determines where and how large a ghost-generated region is. The generation-region determination unit 122 determines a generation region in accordance with a position on the screen at which a region that involves a difference between a Gr pixel and a Gb pixel is located and/or a position on the screen at which a region that has the color magenta with a high saturation is located.

The light-source-position determination unit 123 determines the position of a ghost-light source. The light-source-position determination unit 123 determines the position of a ghost-light source according to a ghost-generated region determined by the generation-region determination unit 122. When, for example, ghost regions are located locally at, or close to, the top edge of the screen, the light-source-position determination unit 123 determines that a ghost-light source is located above an image capturing element 104. The ghost-light source may hereinafter be simply referred to as a light source. Under conditions different from those used by the generation-region determination unit 122, the light-source-position determination unit 123 may determine the position of a ghost-light source in accordance with a region that involves a large difference between a Gr pixel and a Gb pixel and/or a region that has the color magenta with a high saturation.

The intensity detection unit 124 detects a ghost intensity. In particular, for a region for which the generation-region determination unit 122 has determined that a ghost has been generated therein, the intensity detection unit 124 detects a ghost intensity according to the value of the difference between a Gr pixel and a Gb pixel and/or the saturation of the color magenta.

Figure 14A:
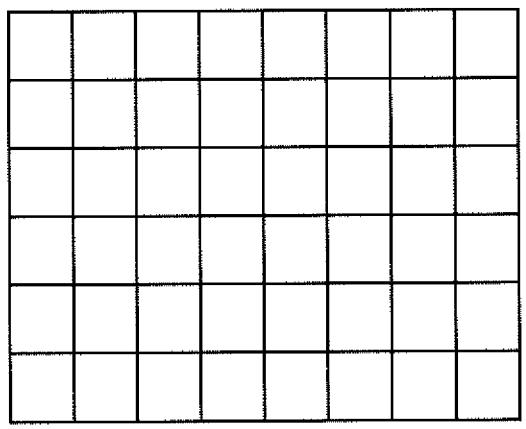
FIG. 14A illustrates an example of regional division for ghost detection in which a screen is divided equally into regions in a lattice formation.

The following describes some examples of regional division performed by the ghost detection unit 120 as described above. FIGS. 14A-14D illustrate examples of regional division for ghost detection. FIG. 14A depicts an example in which the entirety of a screen is divided equally into regions in a lattice formation, i.e., a basic example of regional division. For each of the regions arranged in a lattice formation depicted in FIG. 14A, the ghost detection unit 120 determines whether the region is a generation region.

Figure 14B:
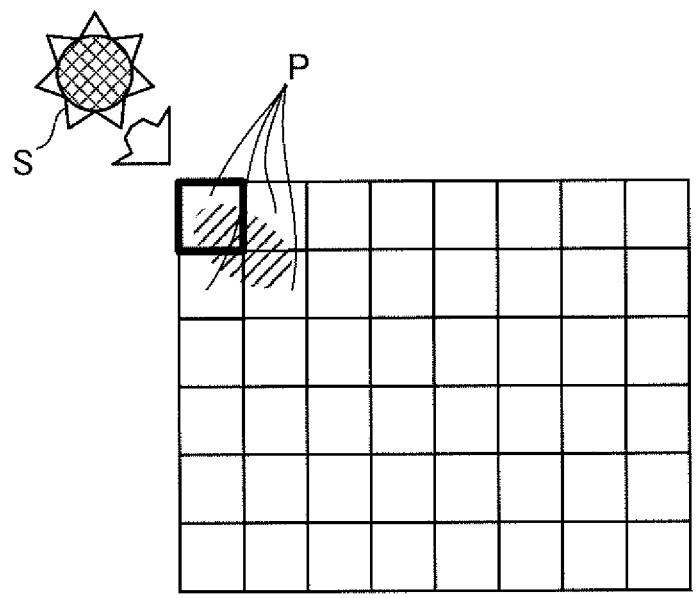
FIG. 14B illustrates an exemplary screen on which a ghost has been generated.

FIG. 14B illustrates an exemplary screen on which a ghost has been generated. Let S indicate the position of a light source. In FIG. 14B, the light source is located diagonally to the upper left of, and outside, an image plane. The light source generates a ghost, for example, at the upper-left corner of the screen and regions therearound. P indicates ghost-generated regions.

As described above, providing a sensor to determine a ghost allows the ghost detection unit 120 to determine generation of a ghost and the position of a light source according to outputs from the sensor. After the position of a light source is identified by the sensor, the regional division for detection may be performed with reference of the position of a light source (FIGS. 14C and 14D), rather than assuming uniform dividing as depicted in FIG. 14A. For example, after the position of a light source is identified by the sensor, the intensity detection unit 124 may detect the intensity of a ghost using the regions obtained by dividing the screen with reference to from the position of the light source. This allows unnecessary regions to be prevented from being detected, thereby shortening the processing time.

Figure 14C:
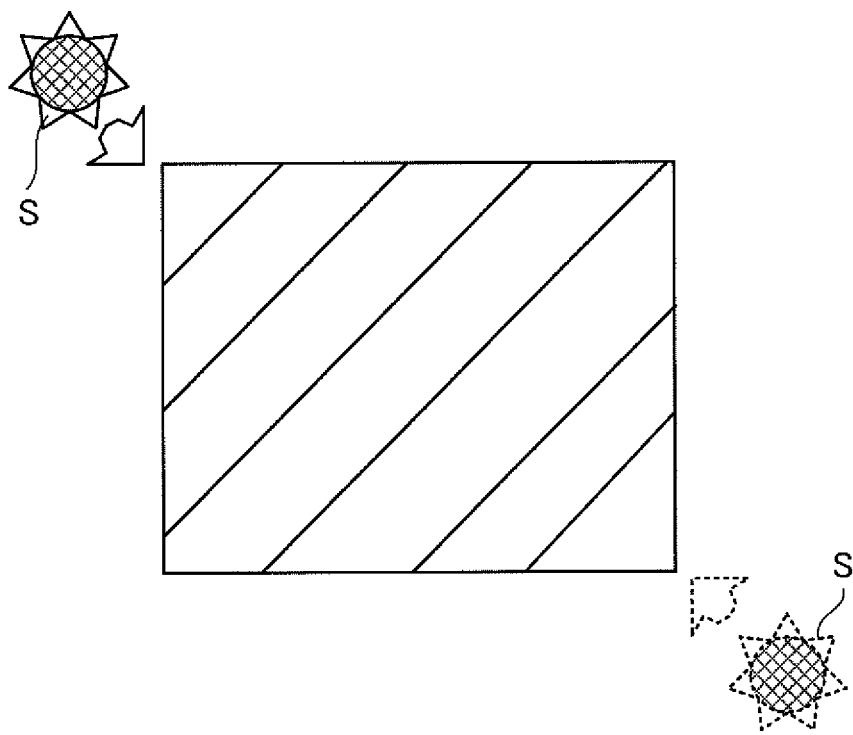
FIG. 14C illustrates an example of regional division achieved when a light source is located diagonally to the upper left or lower right of, and outside, an image plane.
Figure 14D:
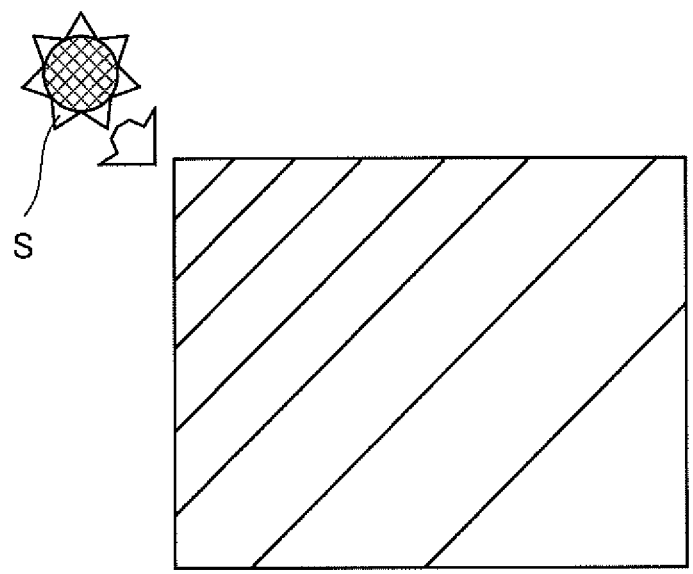
FIG. 14D illustrates an example of regional division achieved when a light source is located diagonally to the upper left of, and outside, an image plane.

FIG. 14C illustrates an example of regional division achieved when a light source is located diagonally to the upper left or lower right of, and outside, an image plane. FIG. 14D illustrates an example of regional division achieved when a light source is located diagonally to the upper left of, and outside, an image plane. In the example of FIG. 14D, the upper-left portions that are closer to the light source are more finely divided, and the portions that are further from the light source are more roughly divided. That is, smaller regions for detection are established at positions closer to the light source, and larger regions for detection are established at positions further from the light source. This enables regions that are close to the light source and that are affected by crosstalk of a ghost to be minutely determined.

The examples of diagonal division depicted in FIGS. 14C and 14D correspond to a situation in which a light source is located outside an image plane, but diagonal division may be applied to a situation in which a light source is within an image plane.

The determination based on the color magenta described above may be performed using raw data before image processing, or may be performed using YC data after image processing. In either case, the determination is preferably performed using data combined with white balance so as to eliminate a difference in color between light sources.

The ghost detection unit 120 may perform the process of determining or detecting using a still image after still image shooting, or may perform such a process using a live-view image during live-view displaying before still image shooting. During moving image shooting, the ghost detection unit 120 may perform the process of determining or detecting using a current or past frame of a moving image.

FIG. 7 is a functional block diagram for a situation in which the ghost detection unit 120 is achieved by software. FIG. 1 depicts an example in which the ghost detection unit 120, the correction-target-pixel setting unit 130, and the pixel correction unit 132 consist of hardware. However, the ghost detection unit 120 and the like may be achieved through software processing based on the microcomputer 150. A control unit 180 is achieved by the microcomputer 150 into which a control program stored in the flash memory 154 has been loaded. The ghost detection unit 120, the correction-target-pixel setting unit 130, and the pixel correction unit 132, which are included in the control unit 180, are also achieved by the microcomputer 150 into which a control program has been loaded.

Figure 8:
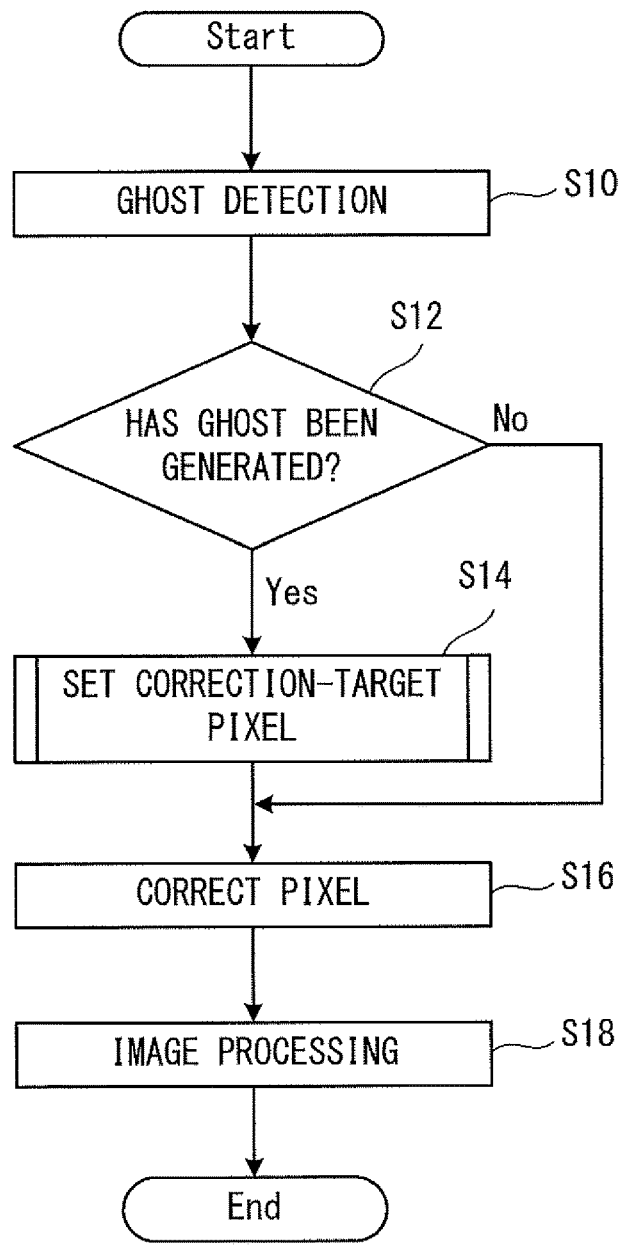
FIG. 8 is a flowchart illustrating a procedure of a crosstalk correction process.

FIG. 8 is a flowchart illustrating a procedure of a correction process and, in particular, a crosstalk correction process. The ghost detection unit 120 performs a ghost determination (step S10). In step S10, the generation determination unit 121, the generation-region determination unit 122, the light-source-position determination unit 123, and the intensity detection unit 124 that are included in the ghost detection unit 120 perform processes of determining and detecting ghost generation. Specific processes performed by each unit have been described above with reference to FIG. 6.

The generation determination unit 121 determines whether a ghost has been generated (step S12). When the generation determination unit 121 has determined that a ghost has been generated (Yes in step S12), the correction-target-pixel setting unit 130 sets a correction-target pixel (step S14). When the generation determination unit 121 has determined that a ghost has not been generated (No in step S12), the flow shifts to step S16.

Figure 9:
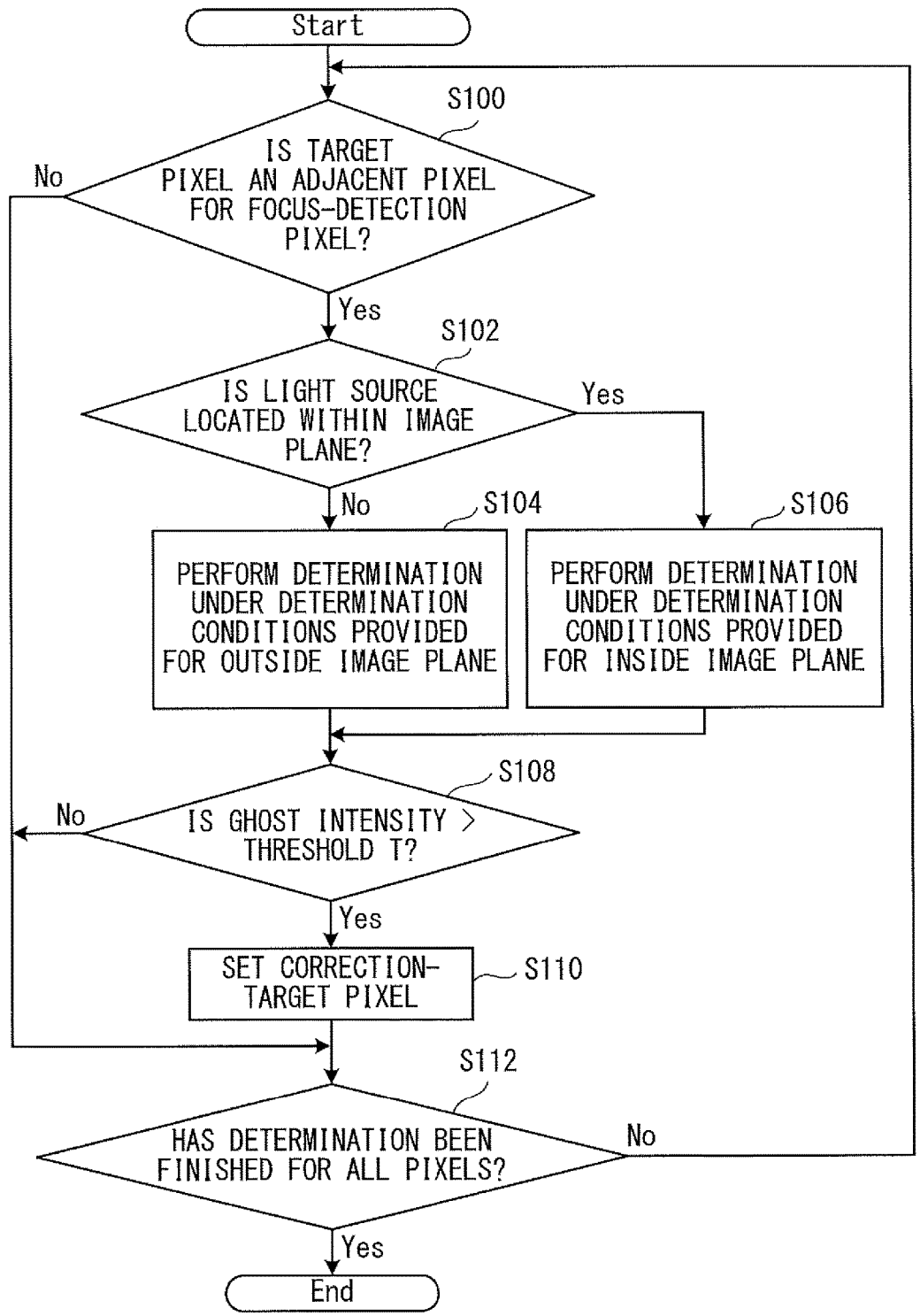
FIG. 9 illustrates a subroutine explaining a procedure of a process of setting a correction-target pixel.

FIG. 9 illustrates a subroutine explaining a procedure of a process of setting a correction-target pixel. The correction-target-pixel setting unit 130 defines the individual pixels of the image capturing element 104 as target pixels and, for each target pixel, determines whether to set it as a correction-target pixel. This determination may be performed only for a region that the generation-region determination unit 122 judges to be affected by the ghost.

The correction-target-pixel setting unit 130 determines whether the target pixel is an adjacent pixel for a focus-detection pixel (step S100). When the correction-target-pixel setting unit 130 has determined that the target pixel is not an adjacent pixel for a focus-detection pixel (No in step S100), the flow shifts to step S112. Adjacent pixels for a pixel may include diagonally adjacent pixels in addition to vertically adjacent and horizontally adjacent pixels.

When the correction-target-pixel setting unit 130 has determined that the target pixel is an adjacent pixel for a focus-detection pixel (Yes in step S100), the correction-target-pixel setting unit 130 determines whether a ghost-light source is located within an image plane (step S102). According to the result of the determination performed by the light-source-position determination unit 123, the correction-target-pixel setting unit 130 determines whether the light source is located within an image plane. When the correction-target-pixel setting unit 130 has determined that the ghost-light source is located outside the image plane (No in step S102), the correction-target-pixel setting unit 130 sets a correction-target pixel under determination conditions provided for the outside of the image plane (step S104).

When the correction-target-pixel setting unit 130 has determined that the light source is located outside the image plane, the correction-target-pixel setting unit 130 sets a correction-target pixel from among image pixels adjacent to the focus-detection pixel in accordance with a relationship with the position of the light source. When the correction-target-pixel setting unit 130 has determined that the light source is located outside the image plane, the correction-target-pixel setting unit 130 sets, for every focus-detection pixel, an image pixel adjacent to the focus-detection pixel in an identical direction as a correction-target pixel. This is because when the light source is located outside the image plane, the focus-detection pixels within a region affected by a ghost can be considered to be located approximately in the same direction as viewed from the light source.

The following describes specific examples.

1) When a ghost-light source is located outside an image capturing plane, the correction-target-pixel setting unit 130 sets, as a correction-target pixel, a pixel located in an opposite direction from the position of the light source from among image pixels adjacent to a focus-detection pixel. A pixel located in an opposite direction from the position of the light source is referred to as a counter pixel.

A counter pixel may be represented as a pixel distant from the light source from among the adjacent image pixels. Accordingly, when the light source is located outside the image plane, the correction-target-pixel setting unit 130 may set, as correction-target pixels, one or more pixels from among the image pixels adjacent to the focus-detection pixel in an order starting from the pixel that is the most distant from the light source.

Figure 10A:
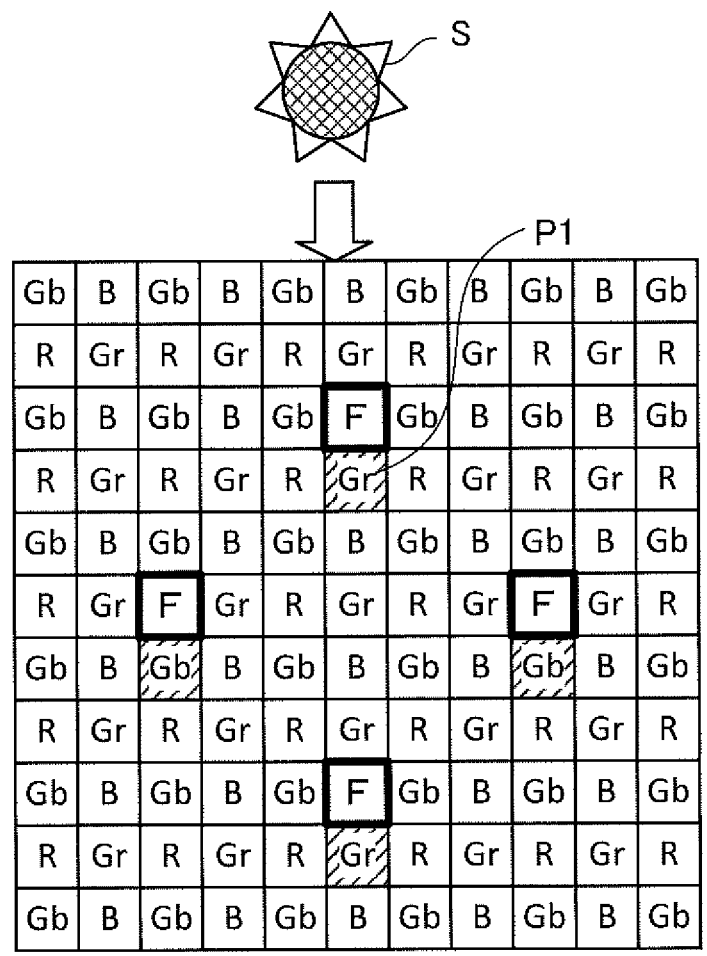
FIG. 10A illustrates the position of a correction-target pixel for a situation in which a light source is located above an image capturing plane.
Figure 10B:
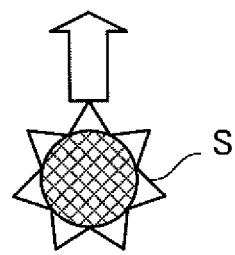
FIG. 10B illustrates the position of a correction-target pixel for a situation in which a light source is located below an image capturing plane.
Figure 10C:
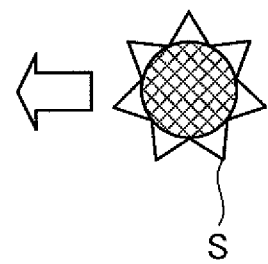
FIG. 10C illustrates the position of a correction-target pixel for a situation in which a light source is located to the right of an image capturing plane.
Figure 10D:
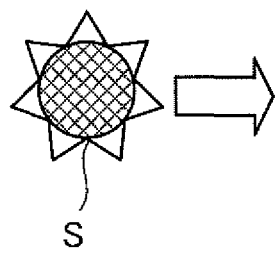
FIG. 10D illustrates the position of a correction-target pixel for a situation in which a light source is located to the left of an image capturing plane.

The following describes specific examples. In FIG. 10A and the like, S indicates the position of a light source, F indicates a focus-detection pixel, and hatching indicates a correction-target pixel.

a) When a light source is located above the upper edge of an image capturing plane, a pixel marked by diagonal lines that is located adjacent to, and below, a focus-detection pixel F is set as a correction-target pixel (see FIG. 10A).

b) When a light source is located below the lower edge of an image capturing plane, a pixel marked by diagonal lines that is located adjacent to, and above, a focus-detection pixel F is set as a correction-target pixel (see FIG. 10B).

c) When a light source is located to the right of the right edge of an image capturing plane, a pixel marked by diagonal lines that is located adjacent to, and to the left of, a focus-detection pixel F is set as a correction-target pixel (see FIG. 10C).

d) When a light source is located to the left of the left edge of an image capturing plane, a pixel marked by diagonal lines that is located adjacent to, and to the right of, a focus-detection pixel F is set as a correction-target pixel (see FIG. 10D).

The descriptions above in a) to d) are based on the assumption that one correction-target pixel is set, but a plurality of correction-target pixels may be set in the present invention. For example, in FIG. 10A, the respective adjacent R pixels located to the right and left of the correction-target pixel indicated by P1 (Gr pixel) may additionally be correction-target pixels. In accordance with a ghost intensity, it may be determined whether to include the right and left pixels as correction-target pixels.

Figure 11C:
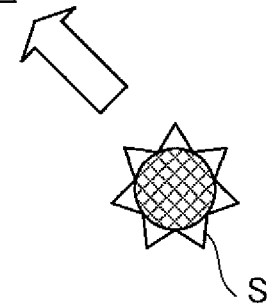
FIG. 11C illustrates the position of a correction-target pixel for a situation in which a light source is located diagonally to the lower right of an image capturing plane.

2) When a ghost-light source is located outside an image plane and around (in the vicinity of) a corner of the image plane, the correction-target-pixel setting unit 130 determines that pixels in two directions are counter.

a) When alight source is located diagonally to the upper-right of the image capturing plane, the respective adjacent pixels marked by diagonal lines that are located below and to the left of a focus-detection pixel are set as correction-target pixels (see FIG. 11A).

b) When a light source is located diagonally to the upper-left of the image capturing plane, the respective adjacent pixels marked by diagonal lines that are located below and to the right of a focus-detection pixel are set as correction-target pixels (see FIG. 11B).

c) When a light source is located diagonally to the lower-right of the image capturing plane, the respective adjacent pixels marked by diagonal lines that are located above and to the left of a focus-detection pixel are set as correction-target pixels (see FIG. 11C).

d) When a light source is located diagonally to the lower-left of the image capturing plane, the respective adjacent pixels marked by diagonal lines that are located above and to the right of a focus-detection pixel are set as correction-target pixels (see FIG. 11D).

Figure 12:
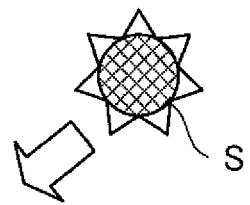
FIG. 12 illustrates the position of a correction-target pixel for a situation in which a light source is located diagonally to the upper right of an image capturing plane.

3) When a ghost-light source is located outside the image plane and in a diagonal direction of the image capturing plane, the correction-target-pixel setting unit 130 may set, as correction-target pixels, not only the respective adjacent pixels located to the right of and to the left of a focus-detection pixel and the respective adjacent pixels located above and below the focus-detection pixels but also a pixel located diagonally adjacent to the focus-detection pixel. In this case, it is determined that pixels in three directions are counter. When, for example, a light source is located diagonally to the upper-right of the image capturing plane, the correction-target-pixel setting unit 130 sets, as correction-target pixels, a pixel marked by diagonal lines that is located adjacent to, and below, a focus detection pixel, and a pixel marked by diagonal lines that is located adjacent to, and to the left of, the focus detection pixel, and a pixel marked by diagonal lines that is diagonally adjacent to, and to the lower-left of, the focus detection pixel (see FIG. 12).

Accordingly, when the determined position of a light source is outside an image plane and around a corner of the screen, the correction-target-pixel setting unit 130 may set, as correction-target pixels, two or more pixels from among the image pixels adjacent to the focus-detection pixel in an order starting from the pixel that is the most distant from the light source.

Return to step S102. When the correction-target-pixel setting unit 130 has determined that the ghost-light source is located within the image plane (Yes in step S102), the correction-target-pixel setting unit 130 sets a correction-target pixel under determination conditions provided for the inside of the image plane (step S106).

When the light source is located within the image plane, the correction-target-pixel setting unit 130 sets a correction-target pixel from among the image pixels adjacent to a focus-detection pixel in accordance with a positional relationship within the image plane between the light source and the focus-detection pixel.

Figure 13B:
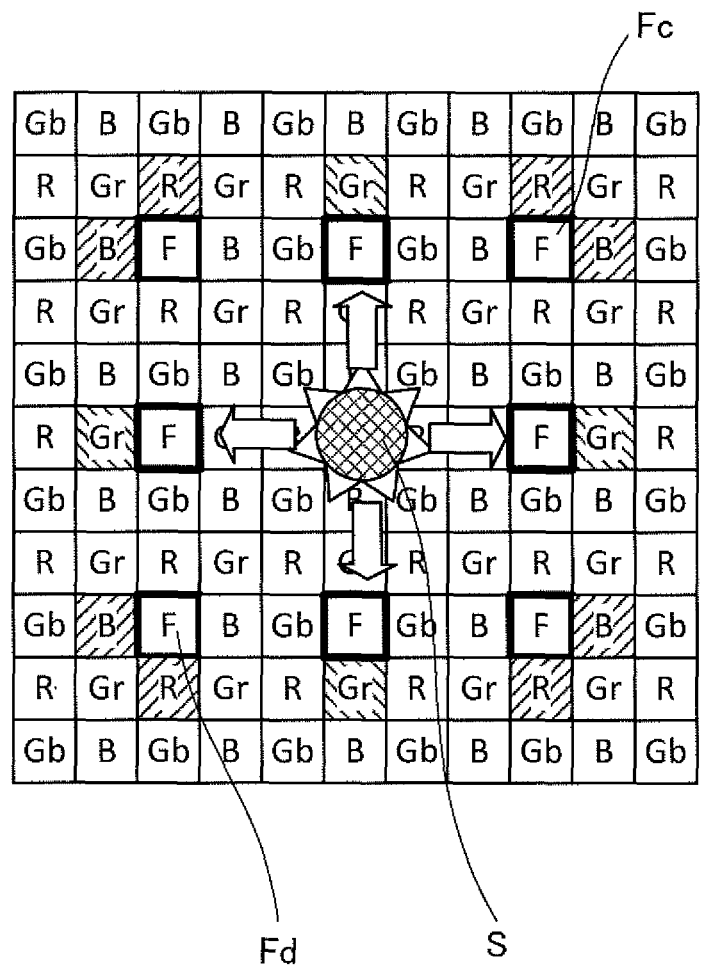
FIG. 13B illustrates the position of a correction-target pixel for a situation in which a light source is located within an image plane.
Figure 13C:
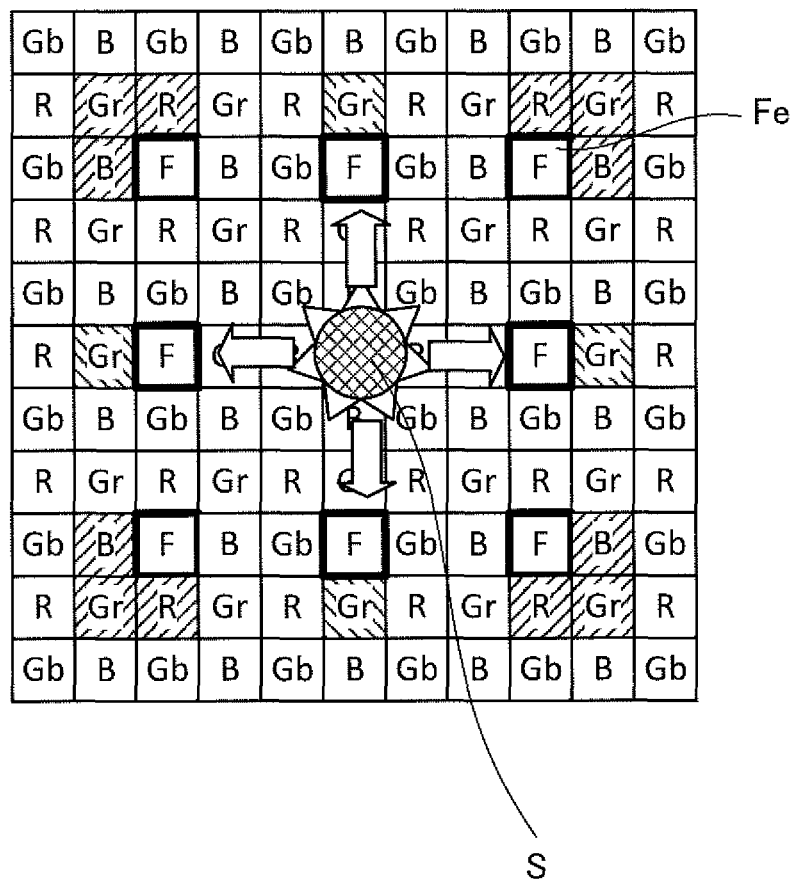
FIG. 13C illustrates the position of a correction-target pixel for a situation in which a light source is located within an image plane.

In particular, the correction-target-pixel setting unit 130 sets, as a correction-target pixel, an image pixel counter to the positional relationship between the light source and the focus-detection pixel from among the image pixels adjacent to the focus-detection pixel. That is, in accordance with the specific positional relationship between the light source and the focus-detection pixel, the correction-target-pixel setting unit 130 sets, as a correction-target pixel, any of a pixel located adjacent to, and above, the focus-detection pixel, a pixel located adjacent to, and below, the focus-detection pixel, a pixel located adjacent to, and to the left of, the focus-detection pixel, and a pixel located adjacent to, and to the right of, the focus-detection pixel. The following describes examples.

a) For example, the correction-target-pixel setting unit 130 may set, as a correction-target pixel, a pixel marked by diagonal lines that is located to the right of a focus-detection pixel Fa that is located to the right of a light source (see FIG. 13A). Similarly, the correction-target-pixel setting unit 130 may set, as a correction-target pixel, a pixel marked by diagonal lines that is located below a focus-detection pixel Fb that is located below a light source (see FIG. 13A).

b) The correction-target-pixel setting unit 130 may set, as correction-target pixels, respective pixels marked by diagonal lines that are located to the right of and above a focus-detection pixel Fc that is located obliquely to the upper-right of a light source (see FIG. 13B). Similarly, the correction-target-pixel setting unit 130 may set, as correction-target pixels, respective pixels marked by diagonal lines that are located to the left of and below a focus-detection pixel Fd that is located obliquely to the lower-left of a light source (see FIG. 13B).

c) When a ghost intensity is greater than a predetermined threshold, the correction-target-pixel setting unit 130 may set a diagonal pixel as a correction-target pixel. For example, the correction-target-pixel setting unit 130 may set, as a correction-target pixel, an adjacent pixel marked by diagonal lines that is located diagonally to the upper-right of a focus-detection pixel Fe located diagonally to the upper-right of a light source, in addition to the respective pixels marked by diagonal lines that are located to the right of and above the focus-detection pixel Fe (see FIG. 13C).

As described above, since focus-detection pixels are located at various positions within an image capturing plane, the focus-detection pixels do not have a constant positional relationship with the light source even when the position of the light source is fixed. Hence, when a light source is located within an image plane, the correction-target-pixel setting unit 130 desirably determines, for each focus-detection pixel, a positional relationship between the focus-detection pixel and the light source so as to set a correction-target pixel.

When the target pixel is set as a correction-target pixel in step S104 or S106, the correction-target-pixel setting unit 130 further determines whether "ghost intensity>threshold T" is satisfied for the target pixel (step S108). This is because when the ghost intensity is low, the crosstalk is small, i.e., the necessity of correction is low. The threshold T is stored in the flash memory 154.

According to the result detected by the intensity detection unit 124, the correction-target-pixel setting unit 130 compares the ghost intensity of a predetermined region that includes the target pixel with the predetermined threshold T so as to determine whether "ghost intensity>threshold T" is satisfied. When the target pixel is not set as a correction-target pixel in step S104 or S106, the correction-target-pixel setting unit 130 shifts to step S112.

When the correction-target-pixel setting unit 130 has determined that "ghost intensity>threshold T" is satisfied (Yes in step S108), the correction-target-pixel setting unit 130 sets the target pixel as a correction-target pixel (step S110). The correction-target-pixel setting unit 130 determines whether the determination has been finished for all effective pixels of the image capturing plane (step S112). When the correction-target-pixel setting unit 130 has determined that "ghost intensity>threshold T" is not satisfied (No in step S108), the correction-target-pixel setting unit 130 shifts to step S112.

When the correction-target-pixel setting unit 130 has determined that the determination has been finished for all pixels (Yes in step S112), the correction-target-pixel setting unit 130 ends the process depicted in FIG. 9 and shifts to step S16 in FIG. 8. When the correction-target-pixel setting unit 130 has determined that the determination has not been finished for all pixels (No in step S112), the correction-target-pixel setting unit 130 returns to step S100.

The subject is returned to step S16 in FIG. 8. The pixel correction unit 132 makes a pixel correction such as a crosstalk correction, a pixel correction of a focus-detection pixel, or a correction of a faulty pixel (step S16). The pixel correction unit 132 makes a crosstalk correction only for pixels that have been set as correction-target pixels by the correction-target-pixel setting unit 130. The pixel correction unit 132 calculates a correction value from the pixel value of image pixels around the correction-target pixel, and defines the correction value as a pixel value for the correction-target value. The pixel correction unit 132 calculates the correction value using a weighting scheme based on block matching.

The pixel correction unit 132 may define the average of the pixel values of surrounding image pixels as a correction value, or may define, as a correction value, an average obtained by performing weighting according to the distance between the correction-target pixel and each of the surrounding typical pixels. Simultaneously, the pixel correction unit 132 may also correct the focus-detection pixel in a similar manner.

In step S16, when a ghost has not been generated, the pixel correction unit 132 makes a pixel correction such as a pixel correction of a focus-detection pixel or a correction of a faulty pixel without making a crosstalk correction.

The image processing unit 134 applies image processing to the pixel that has undergone the image correction (step S18) and generates an output image. The image processing includes WB (White Balancing), demosaicing, color correction, gamma correction, and noise reduction.

Figure 15:
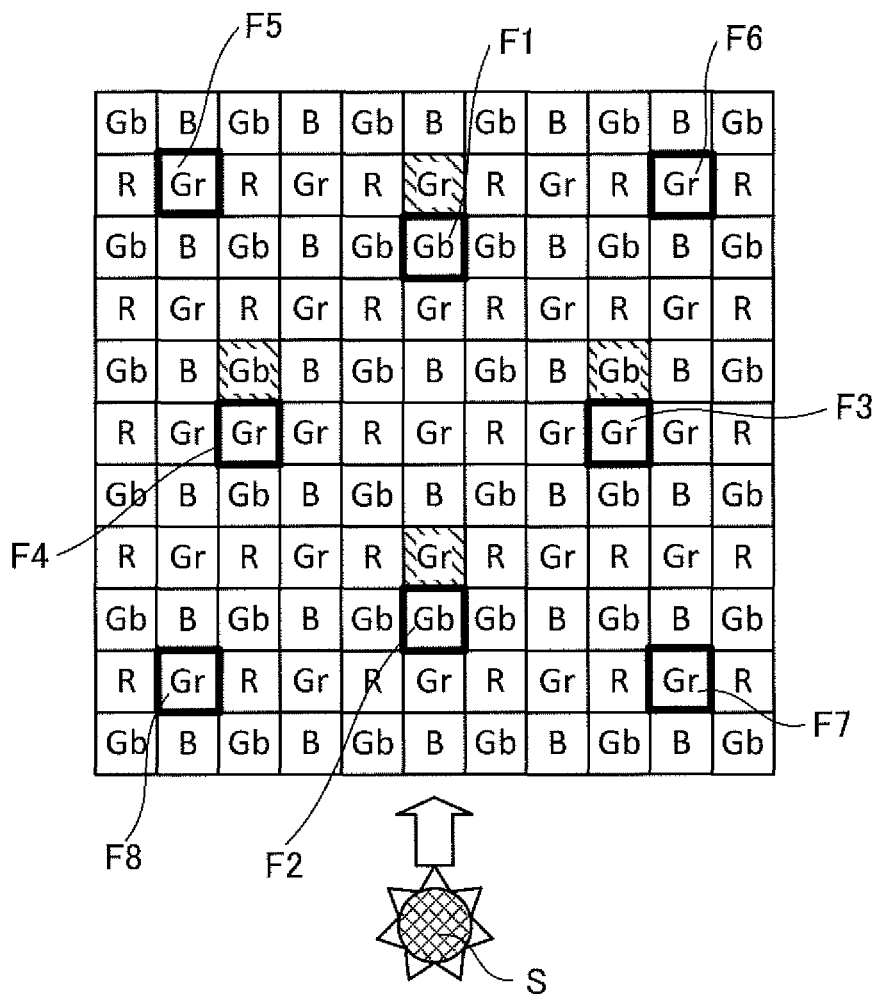
FIG. 15 illustrates an example of the setting of a correction target pixel using focus-detection pixels F with a color characteristic of G.

The following describes an example of setting a correction-target pixel with reference to a focus-detection pixel F provided with a color filter of G. FIG. 15 depicts an exemplary pixel array that includes focus-detection pixels F provided with color filters of G. Pixels indicated by thick-bordered boxes (F1-F8) are focus-detection pixels F.

In particular, focus-detection pixels F1 and F2 that have a color characteristic of G (represented as Gb in the figure) are each located at a predetermined position relative to an image pixel of B. Focus-detection pixels F3 and F4 that have a color characteristic of G (represented as Gr in the figure) are each located at a predetermined position relative to an image pixel of R. That is, the color characteristics of the focus-detection pixels F1 and F2, which would be "B" according to the order of color arrangement, are "Gb". The color characteristics of the focus-detection pixels F3 and F4, which would be "R" according to the order of color arrangement, are "Gr". Accordingly, the focus-detection pixels F1-F4 have color characteristics that are different from those they would have according to the color arrangement of image pixels.

Meanwhile, focus-detection pixels F5-F8 are each located at a predetermined position relative to an image pixel of Gr. The color characteristic of the focus-detection pixels F5-F8 is Gr, and hence the focus-detection pixels F5-F8 have a color characteristic that follows the color arrangement of image pixels. That is, the color filters of the focus-detection pixels F5-F8 follow the order of the color arrangement of image pixels.

When the color characteristic of a focus-detection pixel F is different from the characteristic it would have according to the color arrangement of image pixels (F1-F4), a correction-target pixel is set from among the image pixels adjacent to the focus-detection pixel F. In this example, since the light source S is located below the lower edge, a rule for setting a correction-target pixel is based on the example depicted in FIG. 10B described above. Respective adjacent pixels located above the focus-detection pixels F1-F4 are set as correction-target pixels. The correction-target pixels are marked by diagonal lines.

When the color characteristic of a focus-detection pixel F follows the color arrangement of image pixels, an image pixel adjacent to the focus-detection pixel is not set as a correction-target pixel. That is, none of the pixels adjacent to the focus-detection pixels F5-F8 are set as correction-target pixels. When the color characteristic of a focus-detection pixel follows the color arrangement of the image pixels, there is a small difference between the amount of crosstalk leaked into an image pixel located around the focus-detection pixel and the amount of crosstalk leaked into an image pixel distant from the focus-detection pixel. This is because the influence of the crosstalk caused by a ghost is small. Accordingly, the number of correction-target pixels can be limited.

As described above, as in the case of a focus-detection pixel F that has a color characteristic of transparence (W), a correction-target pixel is set with reference to a focus-detection pixel F that has a color characteristic of G, in accordance with the position of a light source relative to the image capturing plane. Detailed descriptions of the specific setting scheme, which is similar to the scheme described above by referring to FIGS. 11A, 12, and 13A, are omitted herein. Accordingly, noise caused by crosstalk can be reduced for the image capturing element 104 provided with a focus-detection pixel F that has a color characteristic of G.

<Variation>

In the embodiment described above, the correction-target-pixel setting unit 130 sets a correction-target pixel in accordance with the position of a ghost-light source. However, the setting method is not limited to that. For example, the correction-target-pixel setting unit 130 may set a correction-target pixel according to a difference from the pixel value of an image pixel adjacent to a focus-detection pixel. In particular, the correction-target-pixel setting unit 130 may compare the pixel value of one pixel adjacent to a focus detection pixel with the pixel values of other pixels that are located around the one pixel and that have the same color as the one pixel; when the difference is greater than a predetermined threshold, the correction-target-pixel setting unit 130 may set the one pixel as a correction-target pixel on the assumption that the one pixel involves more crosstalk than the other pixels that are located around the one pixel and that have the same color as the one pixel.

In addition, the correction-target-pixel setting unit 130 may set a correction-target pixel using both the information on the position of a ghost-light source and the difference in pixel value, which are described above with reference to steps S104 and S106. For example, when a pixel has been set as a correction-target pixel in accordance with information on the position of a ghost-light source, as long as the difference in pixel value from surrounding pixels is not greater than a predetermined threshold, the correction-target-pixel setting unit 130 may exclude that pixel from the correction-target pixels under the judgement that the influence of crosstalk is small.

Effect

In an image capturing element that has focus-detection pixels installed therein, noise could be generated around a focus-detection pixel due to a ghost, and measures need to be taken against this. In accordance with the embodiment, an image capturing apparatus may be provided that corrects noise generated around a focus-detection pixel of an image capturing element by a ghost.

In the embodiment, correction is performed by appropriately determining a correction-target pixel for which a crosstalk correction needs to be made, thereby enabling reliable suppression of a decrease in image quality that would be caused by a ghost.

A determination is made as to which pixel has been affected by crosstalk, and the pixel is corrected so that pixels that do not need to be corrected can be prevented from being corrected. Bad influences from the making of the correction can be prevented.

A correction-target pixel is set with reference to the position of a ghost-light source so that a pixel that needs a crosstalk correction can be correctly selected.

Note that the present invention is not limited exactly to the above embodiments, and can be embodied in the implementation phases by modifying constitutional elements without departing from the spirit of the present invention. Also, it is possible to form various inventions by an appropriate combination of a plurality of constituent elements disclosed in the above embodiments. For example, all the constituent elements disclosed in the above embodiments may be combined appropriately. Further, constituent elements selected from different embodiments may be combined appropriately. It is as a matter of course that these various modification and application are possible without departing from the spirit of the present invention.

EXPLANATIONS OF LETTERS OR NUMERALS

10: Camera system
100: Camera body
104: Image capturing element
106: Analog processing unit
108: A/D conversion unit
110: Phase-difference-information processing unit
120: Ghost detection unit
121: Generation determination unit
122: Generation-region determination unit
123: Light-source-position determination unit
124: Intensity detection unit
130: Correction-target-pixel setting unit
132: Pixel correction unit
134: Image processing unit
150: Microcomputer
170: ASIC
180: Control unit
200: Interchangeable lens
400: Microlens
402: Color filter
404: Wiring layer
406: Light block
408: Photodiode

What is claimed is:

1. An image capturing apparatus comprising:
an image capturing element that includes image pixels that generate a signal for an image, and focus-detection pixels that generate a signal for focus detection;
a ghost detection circuit that detects a ghost generated in a signal obtained from the image capturing element;
a correction-target-pixel setting circuit that, when the ghost detection circuit has detected that a ghost has been generated, sets, as a correction-target pixel, an image pixel affected by crosstalk of the ghost from among image pixels adjacent to the focus-detection pixel; and a pixel correction circuit that corrects the correction-target pixel according to a correction value calculated from an image pixel located in the vicinity of the correction-target pixel, wherein the ghost detection circuit determines a position of a light source that generates the ghost according to a signal obtained from the image capturing elements, and determines whether the light source is located within an image plane of an image captured by the image capturing element, and the correction-target-pixel setting circuit sets a correction-target pixel in accordance with the determined position of the light source and whether the determined position of the light source is within the image plane.

2. The image capturing apparatus according to claim 1, wherein the correction-target-pixel setting circuit sets, as a correction-target pixel, a pixel adjacent to a focus-detection pixel, from among the focus-detection pixels, that has color characteristics that are different from color characteristics under a color arrangement of the image pixels.

3. The image capturing apparatus according to claim 1, wherein when the determined position of the light source is within the image plane, the correction-target-pixel setting circuit sets, as a correction-target pixel, an image pixel from among the image pixels adjacent to the focus-detection pixel in accordance with a positional relationship between the light source and the focus-detection pixel.

4. The image capturing apparatus according to claim 1, wherein when the determined position of the light source is outside the image plane, the correction-target-pixel setting circuit sets, as correction-target pixels, one or more pixels from among the image pixels adjacent to the focus-detection pixel in an order starting from a pixel that is most distant from the light source.

5. The image capturing apparatus according to claim 1, wherein when the determined position of the light source is outside the image plane and around a corner of a screen, the correction-target-pixel setting circuit sets, as correction-target pixels, two or more pixels from among the image pixels adjacent to the focus-detection pixel in an order starting from a pixel that is most distant from the light source.

6. An image capturing apparatus comprising:

an image capturing element that includes image pixels that generate a signal for an image, and focus-detection pixels that generate a signal for focus detection;

a ghost detection circuit that detects a ghost generated in a signal obtained from the image capturing element;

a correction-target-pixel setting circuit that, when the ghost detection circuit has detected that a ghost has been generated, sets, as a correction-target pixel, an image pixel affected by crosstalk of the ghost from among image pixels adjacent to the focus-detection pixel; and a pixel correction circuit that corrects the correction-target pixel according to a correction value calculated from an image pixel located in the vicinity of the correction-target pixel, wherein the ghost detection circuit divides an image capturing plane of the image capturing element into a plurality of regions and determines a region in which the ghost has been generated, and the correction-target-pixel setting circuit sets a correction-target pixel only within the region for which the ghost has been determined to be generated.

7. An image capturing apparatus comprising:

an image capturing element that includes image pixels that generate a signal for an image, and focus-detection pixels that generate a signal for focus detection;

a ghost detection circuit that detects a ghost generated in a signal obtained from the image capturing element;

a correction-target-pixel setting circuit that, when the ghost detection circuit has detected that a ghost has been generated, sets, as a correction-target pixel, an image pixel affected by crosstalk of the ghost from among image pixels adjacent to the focus-detection pixel; and a pixel correction circuit that corrects the correction-target pixel according to a correction value calculated from an image pixel located in the vicinity of the correction-target pixel, wherein the ghost detection circuit detects generation of the ghost in accordance with a difference between the image pixels adjacent to the focus-detection pixel, and the correction-target-pixel setting circuit sets a correction-target pixel in accordance with a difference between the image pixels adjacent to the focus-detection pixel.

8. An image correction method of correcting an image captured by an image capturing element that includes image pixels that generate a signal for the image, and focus-detection pixels that generate a signal for focus detection, the image correction method comprising:

a detection step of detecting generation of a ghost according to a signal obtained from the image capturing element;

a setting step of, when generation of the ghost has been detected, setting, as a correction-target pixel, an image pixel affected by crosstalk of the ghost from among image pixels adjacent to the focus-detection pixel; and a correction step of correcting the correction-target pixel according to a correction value calculated from an image pixel located in the vicinity of the correction-target pixel, wherein the detection step of detecting generation of a ghost determines whether the light source is located within an image plane of an image captured by the image capturing element, and the correction step of correcting the correction-target pixel changes a setting of the correction-target pixel in accordance with whether the determined position of the light source is within the image plane.

9. An image correction method of correcting an image captured by an image capturing element that includes image pixels that generate a signal for the image, and focus-detection pixels that generate a signal for focus detection, the image correction method comprising:

a detection step of detecting generation of a ghost according to a signal obtained from the image capturing element;

a setting step of, when generation of the ghost has been detected, setting, as a correction-target pixel, an image pixel affected by crosstalk of the ghost from among image pixels adjacent to the focus-detection pixel; and a correction step of correcting the correction-target pixel according to a correction value calculated from an image pixel located in the vicinity of the correction-target pixel, wherein the detection step of detecting generation of a ghost divides an image capturing plane of the image capturing element into a plurality of regions and determines a region in which the ghost has been generated, and the setting step sets a correction-target pixel only within the region for which the ghost has been determined to be generated.

10. An image correction method of correcting an image captured by an image capturing element that includes image pixels that generate a signal for the image, and focus-detection pixels that generate a signal for focus detection, the image correction method comprising:

a detection step of detecting generation of a ghost according to a signal obtained from the image capturing element;

a setting step of, when generation of the ghost has been detected, setting, as a correction-target pixel, an image pixel affected by crosstalk of the ghost from among image pixels adjacent to the focus-detection pixel; and a correction step of correcting the correction-target pixel according to a correction value calculated from an image pixel located in the vicinity of the correction-target pixel, wherein the detection step of detecting generation of a ghost detects generation of the ghost in accordance with a difference between the image pixels adjacent to the focus-detection pixel, and the setting step sets a correction-target pixel in accordance with a difference between the image pixels adjacent to the focus-detection pixel.

* * * * *